United States Patent [19]

De Luca et al.

[11] Patent Number: 4,759,057
[45] Date of Patent: Jul. 19, 1988

[54] TELEPHONE MODULAR DISTRIBUTING FRAME

[75] Inventors: Paul V. De Luca, Plandome Manor; Neil Wainwright, Huntington Station, both of N.Y.

[73] Assignee: Porta Systems Corp., Syosset, N.Y.

[21] Appl. No.: 56,606

[22] Filed: Jun. 1, 1987

[51] Int. Cl.$^4$ ............................................. H04Q 1/14
[52] U.S. Cl. ..................... 379/327; 361/429; 361/428
[58] Field of Search ............... 379/325, 326, 327, 328, 379/329, 330, 331, 332; 361/425–430; 339/18 R, 126 R

[56] References Cited

U.S. PATENT DOCUMENTS

| | | | |
|---|---|---|---|
| 4,002,856 | 1/1977 | Sedlacek et al. | 379/327 |
| 4,012,096 | 3/1977 | DeLuca et al. | 379/327 |
| 4,117,273 | 9/1978 | Goutier et al. | 379/327 |
| 4,313,039 | 1/1982 | DeLuca et al. | 379/327 |
| 4,320,261 | 3/1982 | Scerbo et al. | 379/327 X |
| 4,390,755 | 6/1983 | Pierresteguy | 379/327 |
| 4,470,102 | 9/1984 | DeLuca et al. | 379/327 X |
| 4,603,377 | 7/1986 | Kobayashi et al. | 379/327 X |
| 4,649,236 | 3/1987 | DeLuca et al. | 379/327 |
| 4,665,546 | 5/1987 | Brey et al. | 379/327 |

FOREIGN PATENT DOCUMENTS

| | | | |
|---|---|---|---|
| 3411711 | 10/1985 | Fed. Rep. of Germany | 379/327 |
| 0145987 | 1/1981 | German Democratic Rep. | 379/327 |
| 0052191 | 3/1985 | Japan | 379/327 |
| 1210338 | 10/1970 | United Kingdom | 379/327 |

OTHER PUBLICATIONS

Ashby et al., "Tackling a Giant: The Main Frame Problem", Telesis, Spring 1973, pp. 22–28.

*Primary Examiner*—James L. Dwyer
*Attorney, Agent, or Firm*—Charles E. Temko

[57] ABSTRACT

An improved telephone modular distributing frame is disclosed. The frame is particularly adapted for use with relatively large connector blocks in conjunction with relatively smaller protector blocks with provision made for maximum space utilization, ease of installation, and ready availability of the protector blocks after installation. The frame is double sided, and is characterized in the spacing of the connector blocks upon a greater area on one side of the frame, and a relatively lesser centrally located area on the opposite side of the frame where the protector blocks are located.

2 Claims, 1 Drawing Sheet

TELEPHONE MODULAR DISTRIBUTING FRAME

BACKGROUND OF THE INVENTION

This invention relates generally to the field of telephony, and more particularly to telephone main distributing frames which are mounted in telephone offices for the purpose of supporting connector blocks on one side of the frame and protector blocks on the other side thereof.

In U.S. Pat. No. 4,313,039 granted June 26, 1982 to the same assignee as the present invention, there is disclosed a modular distribution frame having oppositely disposed sides, one of which supports connector blocks leading to inside plant equipment, and the other side of which supports protector blocks associated with outside plant cables carrying incoming subscriber pairs from a cable vault. To facilitate installation, corresponding protector blocks and connector blocks are pre-wired and include a cable stub, so that the box may be installed by first securing the protector block in position on one side of the frame, and passing the connector block and accompanying pre-wired cable through a horizontal opening in the frame to anchor it on the opposite side. The cable stub is then interconnected to the connectorized cable to complete the installation. Much individual wiring of connections at the installation site is thereby eliminated.

Where the protector block and connector block are approximately the same size, and may occupy corresponding areas on either side of the frame, the above procedure may be followed with little difficulty and the blocks are continuously accessible to service personnel both during initial installation and subsequent servicing operations. Often, the above-described frame must be used in conjunction with connector blocks which are appreciably larger than the associated protector blocks for reasons which are beyond the control of the manufacturer. A typical case is that in which the connector blocks are foreign design and cannot be substituted by blocks of more suitable size without affecting the compatability of the other components of the system. Thus, such connector blocks must be a part of the installation, notwithstanding the fact that they are less efficient from the aspect of subscriber pair density, and are awkwardly configured. Such blocks are not conveniently arranged on one side of the frame without wasting a substantial amount of the area available for mounting. On the other side of the frame, there is still present the need for accessibility of protector modules to service personnel, notwithstanding that access of the connector blocks is not normally required after installation.

SUMMARY OF THE INVENTION

Briefly stated, the invention contemplates the provision of an improved distributing frame construction capable of mounting awkwardly configured connector blocks in an orderly arrangement using horizontal rows of blocks which extend substantially the entire length of the frame, each row separated by a horizontal wire trough, there being horizontal express troughs at the upper and lower ends of the frame. On the other side of the frame, the protector blocks are located in corresponding horizontal rows which are vertically disposed at substantially smaller vertical increments, so as to be positioned substantially close together whereby the exposed protector modules carried by the protector blocks are readily available to craft persons without the use of step stools or the necessity of stooping.

BRIEF DESCRIPTION OF THE DRAWING

In the drawing, to which reference will be made in the specification, similar reference characters have been employed to designate corresponding parts through the several views.

DETAILED DESCIRPTION OF THE DISCLOSED EMBODIMENT

Figure 3:
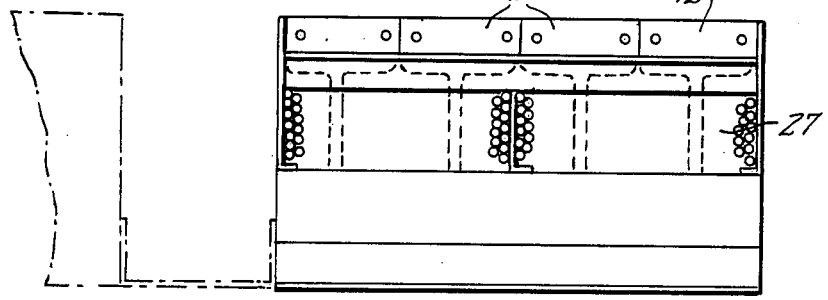
FIG. 3 is a top plan view thereof.

In accordance with the invention, the device, generally indicated by reference character 10, comprises broadly, a frame element 11, a plurality of connector blocks 12, and a plurality of protector blocks 13. As described in the above-mentioned U.S. Pat. No. 4,313,039 the box 12 and 13 are preferably pre-wired to facilitate installation upon the frame in the telephone office or other locus of installation. The frame has two working sides. The block assemblies each include a connector block prewired to a terminal block. The connector block is also provided with specified lengths of stub cable (not shown) which can enter the frame from either above or below. During installation, the terminal blocks are "fed through" the plane of the frame, and are mounted generally opposite the respective protector blocks on a second side of the frame.

Where the connector blocks and protector blocks are substantially the same size, as disclosed in the above-mentioned patent, little difficulty is encountered with such installation. Where the connector blocks are substantially larger, installation geometry is not as efficient, and is accommodated by distributing the protector blocks over a greater area of one side of the frame, in some cases, above the reach of craft personnel without resort to a step stool or the like, and below a level which can be comfortably reached without stooping. While such location constitutes a one-time inconvenience during installation, it is desirable that the corresponding protector blocks be located within arm's reach of such personnel after installation, to facilitate removal or replacement of the individual protector modules which are carried by the protector blocks. This is accomplished by installing the protector blocks in rows which are parallel to the rows of the connector blocks, but which are vertically offset therefrom.

Accordingly, the frame element 11 is structured to include a plurality of vertically extending support members 20 which are held in mutually spaced elevation by horizontally extending support members 21, parallel horizontal wire troughs 22, as well as upper and lower express troughs 23 and 24.

Figure 2:
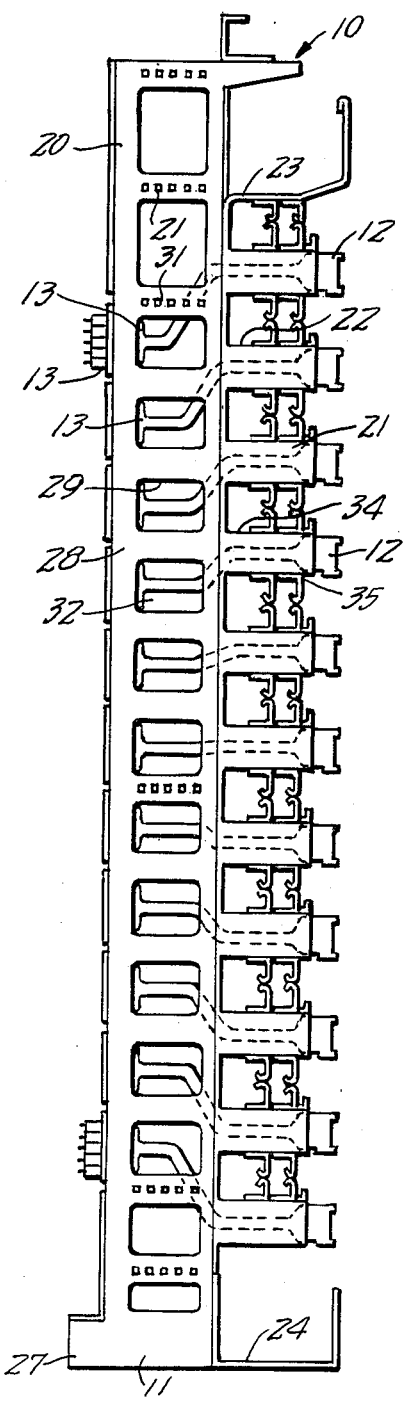
FIG. 2 is a side elevational view thereof.
Figure 1:
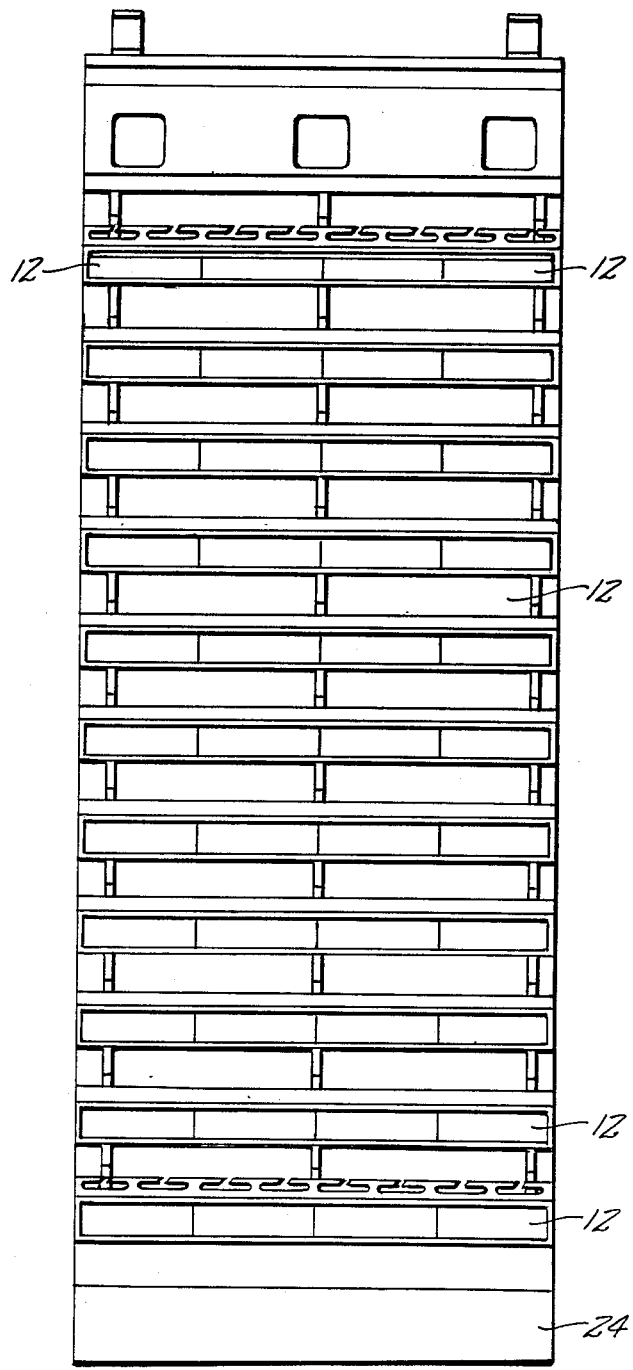
FIG. 1 is a front elevational view of an embodiment of the invention.

The members 20 rest upon a lower base portion 27, and include a skeletonized module support portion 28 having rectangular through openings 29 to provide lightness and ease of installation. The horizontally extending tubular support members 21 are of hollow rectangular cross-section, and include horizontal walls 31 which define interstices 32 into which the protector modules 13 are inserted and fixed in position. Correspondingly, the troughs 22 include horizontal walls 34 forming interstices 35 for the accommodation of the blocks 12. As best seen in FIG. 1, it will be observed that while the blocks 12 have a vertical height somewhat less than that of the blocks 13, they have a horizontal width which is substantially greater, thus limiting the number of same which can be installed in any given horizontal row. As a result, more rows are required than would otherwise be necessary, and these are distributed over a relatively large area of one side of the frame, with the lowermost row being considerably lower, and the uppermost row considerably higher than that of the corresponding rows supporting the protector blocks (see FIG. 2).

Installation of the blocks 12 and 13 is in a manner disclosed in the above-mentioned patent, it being observed that only the vertically medially positioned rows on each side of the frame are disposed directly opposite each other, with the remaining rows being offset. This is facilitated by providing an odd number of rows. After installation, the protector blocks 13 are positioned relatively centrally of the connector blocks (in a vertical direction), thus materially facilitating the protector modules 36.

We wish it to be understood that we do not consider the invention to be limited to the precise details of structure shown and set forth in this specification, for obvious modifications will occur to those skilled in the art to which the invention pertains.

We claim:

1. In a two-sided telephone modular distributing frame using pre-wired block modules, each including a connector block mounted on one side of said frame and an interconnected protector block having individual protector modules thereon mounted on a second side of said frame, said connector blocks being substantially larger in overall configuration than said protector blocks, the improvement comprising: said first side of said frame having a vertically spaced plurality of horizontally oriented tubular members defining interstices accommodating said protector blocks, said second side of said frame having a plurality of vertically spaced horizontally oriented trough members defining interstices accommodating said connector blocks; said connector blocks occupying a given area on said second side of said frame, said protector blocks occupying a second area on said first side of said frame substantially smaller than that of said given area, said second area being positioned to occupy vertically a generally medial portion of said given area, whereby the protector modules of said protector blocks are readily available to service personnel.

2. The improvement set forth in claim 1, further characterized in said protector blocks being arranged in an odd number of horizontal rows, said connector blocks also being arranged in an odd number of horizontal rows, a medially disposed row of each of said connector protector blocks being arranged directly opposite each other.

* * * * *